(12) United States Patent
McDysan et al.

(10) Patent No.: US 9,282,352 B2
(45) Date of Patent: Mar. 8, 2016

(54) UNDER-THE-BOTTOM TIME-SHIFTED DELIVERY OF VIDEO CONTENT

(75) Inventors: David E. McDysan, Great Falls, VA (US); Daniel J. O'Callaghan, Fairfax Station, VA (US); Stevan H. Leiden, Norwood, MA (US); Douglas M. Pasko, Bridgewater, NJ (US); John E. Rathke, Southborough, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 327 days.

(21) Appl. No.: 12/953,209

(22) Filed: Nov. 23, 2010

(65) Prior Publication Data

US 2012/0131623 A1    May 24, 2012

(51) Int. Cl.
*H04N 21/24*    (2011.01)
*H04N 21/262*    (2011.01)
*H04N 21/643*    (2011.01)

(52) U.S. Cl.
CPC ........... *H04N 21/2402* (2013.01); *H04N 21/24* (2013.01); *H04N 21/262* (2013.01); *H04N 21/26275* (2013.01); *H04N 21/64322* (2013.01)

(58) Field of Classification Search
CPC ..... H04L 47/10; H04L 67/1002; H04L 67/22; H04L 41/5009; H04L 43/062; H04N 21/64738; H04N 21/262; H04N 21/24; H04N 21/2402
USPC .................................................... 725/96, 119
See application file for complete search history.

(56) References Cited

U.S. PATENT DOCUMENTS

| 7,433,943 | B1 * | 10/2008 | Ford ............................. 709/223 |
| 2006/0253622 | A1 * | 11/2006 | Wiemann et al. ............... 710/52 |
| 2007/0250880 | A1 * | 10/2007 | Hainline ........................ 725/97 |
| 2010/0027966 | A1 | 2/2010 | Harrang et al. |
| 2010/0031299 | A1 | 2/2010 | Harrang et al. |
| 2010/0070628 | A1 | 3/2010 | Harrang et al. |
| 2010/0121941 | A1 | 5/2010 | Harrang et al. |
| 2010/0125672 | A1 * | 5/2010 | Mobin et al. .................. 709/231 |
| 2010/0131385 | A1 | 5/2010 | Harrang et al. |
| 2012/0016986 | A1 * | 1/2012 | Jacquet et al. ................ 709/224 |
| 2012/0233655 | A1 * | 9/2012 | Ansari .......................... 725/118 |

* cited by examiner

*Primary Examiner* — Ricky Chin (57) ABSTRACT

One or more devices, in a video content delivery network, provide real time video content to one or more devices located at a customer premise. The one or more devices also provide non-real time video content to at least one of the customer premise devices during idle time periods associated with the network and using lower effort Internet protocol (IP) transport. The non-real time video content may be broadcast, at a time after the idle time periods, by at least one of the customer premise devices.

20 Claims, 10 Drawing Sheets

UNDER-THE-BOTTOM TIME-SHIFTED DELIVERY OF VIDEO CONTENT

BACKGROUND

Video content (e.g., television shows, pay-per-view (PPV) content, video-on-demand (VOD) content, etc.) may be delivered and selected in several ways. For example, television channels may be broadcast to subscribers' homes and a channel may be viewed via subscriber selection from a channel lineup. Time shifted Internet protocol (IP) television (IPTV) emulates this broadcast delivery over IP, which overcomes bottlenecks associated with lower speed access networks (e.g., twisted pair, digital subscriber line (DSL), wireless, etc. networks) by sending content during time periods when there is spare capacity, or sending content at a rate slower than the playback rate as constrained by an access network bandwidth.

However, IPTV provides a large number of channels that make user selection difficult. Digital video recorders (DVRs) may be used to record video content so that the video content may be viewed at a later time. DVR-based recording, however, is largely limited to tuning to a particular channel (e.g., from a channel lineup), and selecting a time period for recording the particular channel.

Over the top (OTT), or IP unicast, delivery of video content may provide video content to any connected device (e.g., televisions, computers, gaming consoles, smart phones, etc.). OTT video content may include, for example, pre-recorded video content (e.g., television episodes), and content associated with video portals provided by content providers, such as Hulu™, YouTube™, CNN, etc. OTT delivery provides near real time transmission (e.g., with an adaptive transmission rate) of video content, with limited buffering. Furthermore, video content requests are directed to content servers in order to optimize criteria or meet constraints associated with the video content requests. The content servers may optimize the requests' criteria or meet constraints based on performance (e.g., latency), minimum topology hops, historical server load (e.g., sessions, throughput, etc.), economic cost, etc. Content delivery networks (CDNs) may use a variety of mechanisms to determine optimality and/or constraints associated with video content requests. For example, CDNs may configure and transfer address assignments into CDN trackers; may configure domain name system (DNS) redirection; may use load balancers to distribute traffic between servers in a site or between sites; may use quasi-static application layer traffic optimization and pay for performance (P4P) approaches to provide feedback; and may use heuristic algorithms.

However, OTT delivery of video content over a routed network can make use of only limited topology and load information and must convey the content at the playback rate in near real time and only at the requested rate and quality. Furthermore, OTT delivery requires manual (or operations support systems (OSS) application-based) configuration of consistent information in multiple servers. Thus, true optimization is difficult to achieve in OTT delivery of video content and OTT delivery may create network congestion and/or additional operator expense to provision the network for peak load.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide under-the-bottom time-shifted delivery of video content. For example, the systems and/or methods may download and store non-real time video content (e.g., pre-recorded video content, previous television episodes, media-oriented advertisements, etc.) at a customer premise. In one implementation, the systems and/or methods may store the non-real time video content in a large storage device (e.g., a home media device) provided at the customer premise. In other implementations, the systems and/or methods may store the non-real time video content in one or more customer premise devices (e.g., DVRs, televisions, computers, etc.), and may enable the video content to be accessed by any device within the customer premise. The systems and/or methods may download the non-real time video content during idle network times and may uses low bandwidth access links (e.g., wireless access), and could use P4P (e.g., P2P with application layer traffic optimization (ALTO)) for local redistribution of popular or missed content.

In one example implementation, the systems and/or methods may provide IPTV content in real time (or near real time) to a set-top box (STB) located at a customer premise, and may provide video on demand (VOD) content in real time (or near real time) to the STB. The systems and/or methods may provide non-real time video content (e.g., OTT video content) to a customer premise during idle time periods of a network (e.g., low traffic periods, at night, etc.) and using lower effort IP transport (e.g., unicast or multicast), and may broadcast, during a time after the idle time periods, the non-real time video content to one or more customer premise devices. Alternatively, or additionally, the systems and/or methods may provide the non-real time video content to customer premise device(s) for storage (e.g., during the idle time periods), and the STB may retrieve the non-real time video content from the customer premise device(s) at a time after the idle time periods.

As used herein, the terms "subscriber," "customer,' and/or "user" may be used interchangeably. Also, the terms "subscriber," "customer," and/or "user" are intended to be broadly interpreted to include a user device (e.g., a mobile telephone, a personal computer, a set-top box, a television, etc.) or a user of a user device.

Figure 1:
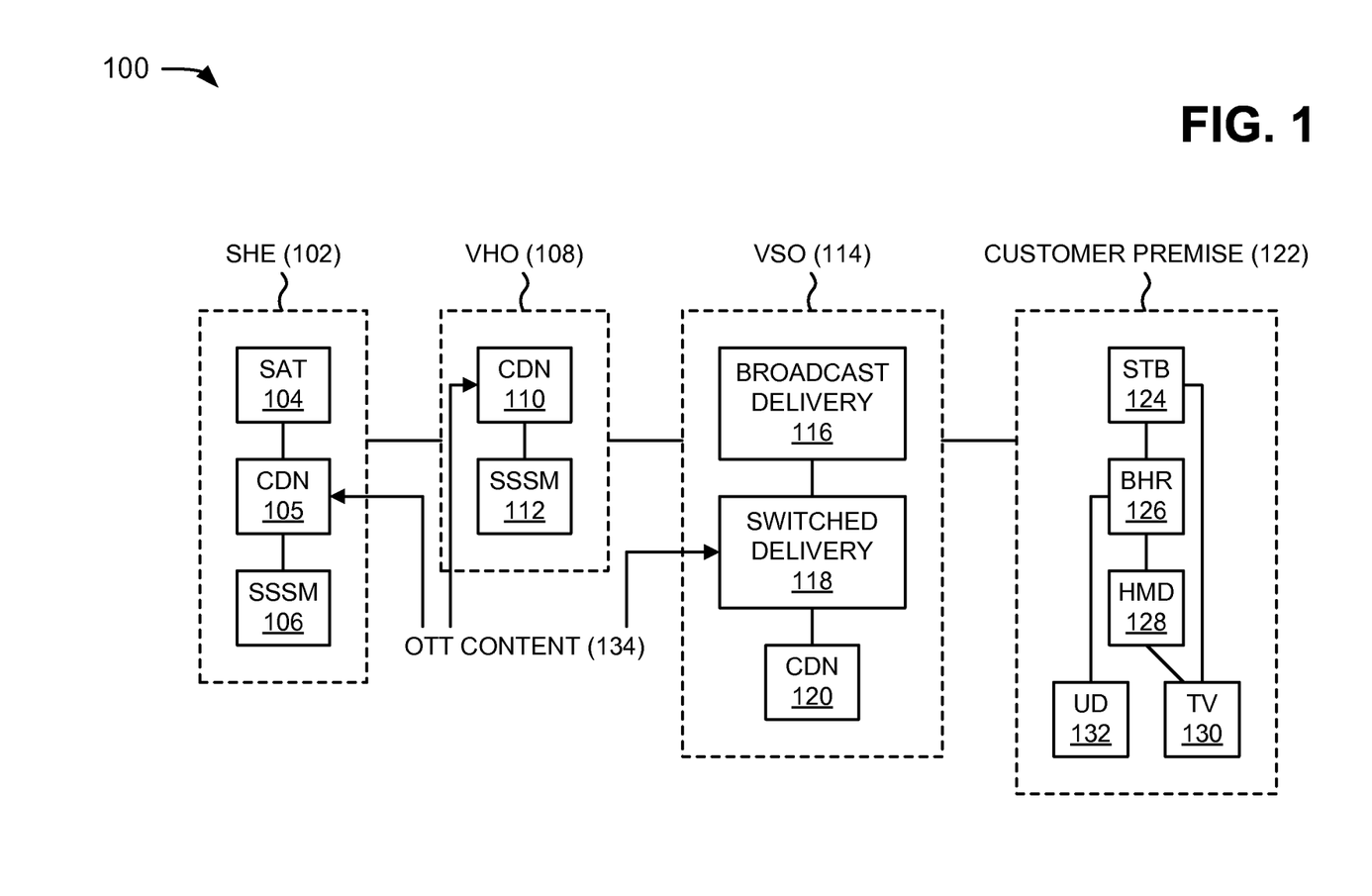
FIG. 1 is a diagram of an example network in which systems and/or methods described herein may be implemented.

FIG. 1 is a diagram of an example network 100 in which systems and/or methods described herein may be implemented. As illustrated, network 100 may include a super head end (SHE) 102 that includes a satellite dish (SAT) 104, content delivery network (CDN) storage 105, and a subscription/ selection/search management (SSSM) server 106; a video hub office (VHO) 108 that includes CDN storage 110 and a SSSM server 112; a video serving office (VSO) 114 that includes a broadcast delivery system 116, a switched delivery system 118, and CDN storage 120; a customer premise 122 that includes a STB 124, a broadband home router (BHR) 126, a home media device (HMD) 128, a television (TV) 130, and a user device (UD) 132.

Components of network 100 may interconnect via wired and/or wireless connections. The lines shown between components of network 100 represent example connections. However, components of network 100 may connect to one or more other components of network 100 even if a line showing a connection is not depicted in FIG. 1. Single components and/or networks have been illustrated in FIG. 1 for simplicity. In practice, there may be more components and/or networks than depicted in FIG. 1.

SHE 102 may include one or more server devices (e.g., a top level of CDN or cache hierarchy), or other types of computation or communication devices, that gather, process, search, and/or provide information in a manner described herein. In one implementation, SHE 102 may include a computer system, applications, a cable head-end, and/or broadcasting devices capable of providing video content (e.g., VOD content, high definition (HD)-VOD content, TV programming, movies, on-demand services, live television, IPTV, etc.), commercials, advertisements, instructions, voice content (e.g., voice over IP (VoIP)), and/or other information to customer premises equipment (CPE). In one example, SHE 102 may include a television media reception, processing, and distribution system that selects, combines, and transmits the video content (e.g., VOD, IPTV, etc.) to other headend distribution systems.

Satellite dish 104 may include a parabolic antenna (or other types of antennas) designed to receive microwaves from communications satellites, which transmit data transmissions or broadcasts, such as satellite television, VOD content, etc.

CDN storage 105 may include a random access memory (RAM) or another type of dynamic storage device that stores information and instructions, a read only memory (ROM) or another type of static storage device that stores static information and instructions, and/or some other type of magnetic or optical recording medium and its corresponding drive for storing information and/or instructions. In one example implementation, CDN storage 105 may receive non-real time video content (e.g., OTT video content, pre-recorded video content, previous episodes, media-oriented advertisements, etc.), and may provide the non-real time video content to CDN storage 110.

SSSM server 106 may include one or more server devices, or other types of computation or communication devices, that gather, process, search, and/or provide information in a manner described herein. In one implementation, SSSM server 106 may include one or more server devices that enable the scheduling and coordinating of under-the-bottom time-shifted distribution of non-real time video content (e.g., OTT video content, pre-recorded video content, previous episodes, media-oriented advertisements, etc.) during idle time periods of network 100 (e.g., at night, during low traffic, etc.). In one example, SSSM server 106 may instruct CDN storage 105 to provide such non-real time video content to CDN storage 110, and SSSM server 112 may instruct CDN storage 110 to forward the non-real time video content to switched delivery system 118, CDN storage 120, and/or HMD 128. The non-real time video content may be provided "under-the-bottom" of network 100 since the content is provided when network 100 is not experiencing congestion. In contrast, and as described above, OTT delivery of video content may create network congestion.

VHO 108 may include one or more server devices, or other types of computation or communication devices, that gather, process, search, and/or provide information in a manner described herein. In one implementation, VHO 108 may include a computer system, applications, and/or broadcasting devices capable of providing video content to a regional location. A regional VHO 108 may serve a local VSO (e.g., VSO 114), and the local VSO may provide the video content to customer premises equipment.

CDN storage 110 may include a RAM or another type of dynamic storage device that stores information and instructions, a ROM or another type of static storage device that stores static information and instructions, and/or some other type of magnetic or optical recording medium and its corresponding drive for storing information and/or instructions. In one example implementation, CDN storage 110 may receive VOD content from satellite dish 104, and may provide the VOD content to broadcast delivery system 116 and/or switched delivery system 118. In another example implementation, CDN storage 110 may receive non-real time video content from CDN storage 105, and may provide the non-real time video content to switched delivery system 118, CDN storage 120, and/or HMD 128.

SSSM server 112 may include one or more server devices, or other types of computation or communication devices, that gather, process, search, and/or provide information in a manner described herein. In one implementation, SSSM server 112 may include one or more server devices that provide under-the-bottom time-shifted distribution of non-real time video content during idle time periods of network 100. In one example, SSSM server 112 may instruct CDN storage 110 to provide such non-real time video content to switched delivery system 118, CDN storage 120, and/or HMD 128. The non-real time video content may be provided "under-the-bottom" of network 100 since the content is provided when network 100 is not experiencing congestion.

VSO 114 may include one or more server devices, or other types of computation or communication devices, that gather, process, search, and/or provide information in a manner described herein. In one implementation, VSO 114 may include a computer system, applications, and/or broadcasting devices capable of receiving video content from a regional VHO (e.g., VHO 108), and providing the video content to customer premises equipment (e.g., to STB 124, BHR 126, etc.).

Broadcast delivery system 116 may include one or more server devices, or other types of computation or communication devices, that gather, process, search, and/or provide information in a manner described herein. In one implementation, broadcast delivery system 116 may include a computer system, applications, and/or broadcasting devices capable of receiving broadcast television content from satellite dish 104, and providing the broadcast television content to STB 124. Broadcast delivery system 116 may also provide IPTV content (e.g., received from satellite dish 104) to switched delivery system 118, and switched delivery system 118 may provide the IPTV content to BHR 126.

Switched delivery system 118 may include one or more server devices, or other types of computation or communication devices, that gather, process, search, and/or provide information in a manner described herein. In one implementation, switched delivery system 118 may include a network of devices capable of receiving VOD content and non-real time video content from CDN storage 110, receiving IPTV content from broadcast delivery system 116, and receiving non-real time video content from CDN storage 120. Switched delivery system 118 may provide the VOD content, the IPTV content, and/or the non-real time video content to BHR 126. Switched delivery system 118 may provide unicast or multicast content. Multicast content may require scheduling by SSSM servers 106/112 to optimize delivery of content to a large number of HMDs 128 (e.g., selecting and subscribing to popular content). Any portions of content dropped during multicast transmission (e.g., due to bit errors or packet loss) can be resent via unicast transmission. Furthermore, if some HMDs 128 are off line (e.g., due to a power or network outage), such HMDs 128 may "caught up" via unicast transmission.

CDN storage 120 may include a RAM or another type of dynamic storage device that stores information and instructions, a ROM or another type of static storage device that stores static information and instructions, and/or some other type of magnetic or optical recording medium and its corresponding drive for storing information and/or instructions. In one example implementation, CDN storage 120 may store non-real time video content received from CDN storage 110, and may provide the non-real time video content to switched delivery system 118.

Customer premise 122 may include a subscriber's premises (e.g., a home) and the associated equipment connected with a service provider (e.g., a carrier's telecommunication equipment).

STB 124 may include a device that receives and/or processes video content, and provides the video content to television 130 or another device. STB 124 may also include decoding and/or decryption capabilities and may further include a digital video recorder (DVR) (e.g., a hard drive). In one example implementation, STB 124 may be incorporated directly within television 130. In another implementation, STB 124 and/or television 130 may be replaced with a computing device (e.g., a personal computer, a laptop computer, a tablet computer, etc.), a cable card, a TV tuner card, or a portable communication device (e.g., a mobile telephone or a PDA). In one example, STB 124 may receive video content (e.g., broadcast television content, IPTV content, VOD content, etc.) from broadcast delivery system 116 and/or BHR 126, and may provide the video content to television 130 for display.

BHR 126 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, BHR 126 may be physically deployed with a satellite antenna (e.g., on a roof or a side wall of a house associated with customer premise 122). BHR 126 may support sharing of cable modem or Internet connections, and may include various network security features like firewall capability. In one example, BHR 126 may receive video content (e.g., IPTV content or VOD content) from switched delivery system 118, and may provide the video content to STB 124. In another example, BHR 126 may receive real time and/or non-real time video content from switched delivery system 118 and/or HMD 128, and may provide the real time and/or non-real time video content to television 130 and/or to user device 132.

HMD 128 may include a RAM or another type of dynamic storage device that stores information and instructions, a ROM or another type of static storage device that stores static information and instructions, and/or some other type of magnetic or optical recording medium and its corresponding drive for storing information and/or instructions. In one example implementation, HMD 128 may provide storage for non-real time video content (e.g., received from CDN storage 110 during idle time periods or network 100), and may provide the non-real time video content to BHR 126 when user device 132 requests the non-real time video content.

Television 130 may include a television monitor that is capable of displaying video content, television programming, content provided by STB 124, and/or content provided by other devices (e.g., a digital video disk (DVD) player, a video camera, etc., not shown) connected to television 130.

User device 132 may include any device that is capable of communicating with BHR 126 (e.g., to reach other functions in network 100, such as SSSM servers 106/112) in order to, for example, request and/or receive video content. For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a customer's home) computation and/or communication device, such as a laptop computer, a personal computer, a tablet computer, a television, a gaming system, etc.

As further shown in FIG. 1, OTT content 134 may be provided to CDN storage 105 (e.g., which may be controlled by SSSM server 106), CDN storage 110 (e.g., which may be controlled by SSSM server 112), and/or switched delivery system 118. OTT content 134 may include, for example, pre-recorded video content (e.g., television episodes); content associated with video portals provided by content providers, such as Hulu™, YouTube, CNN, etc.; video content delivered over an alternative means (e.g., the Internet) rather than a main video delivery infrastructure (e.g., a cable television infrastructure); etc.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
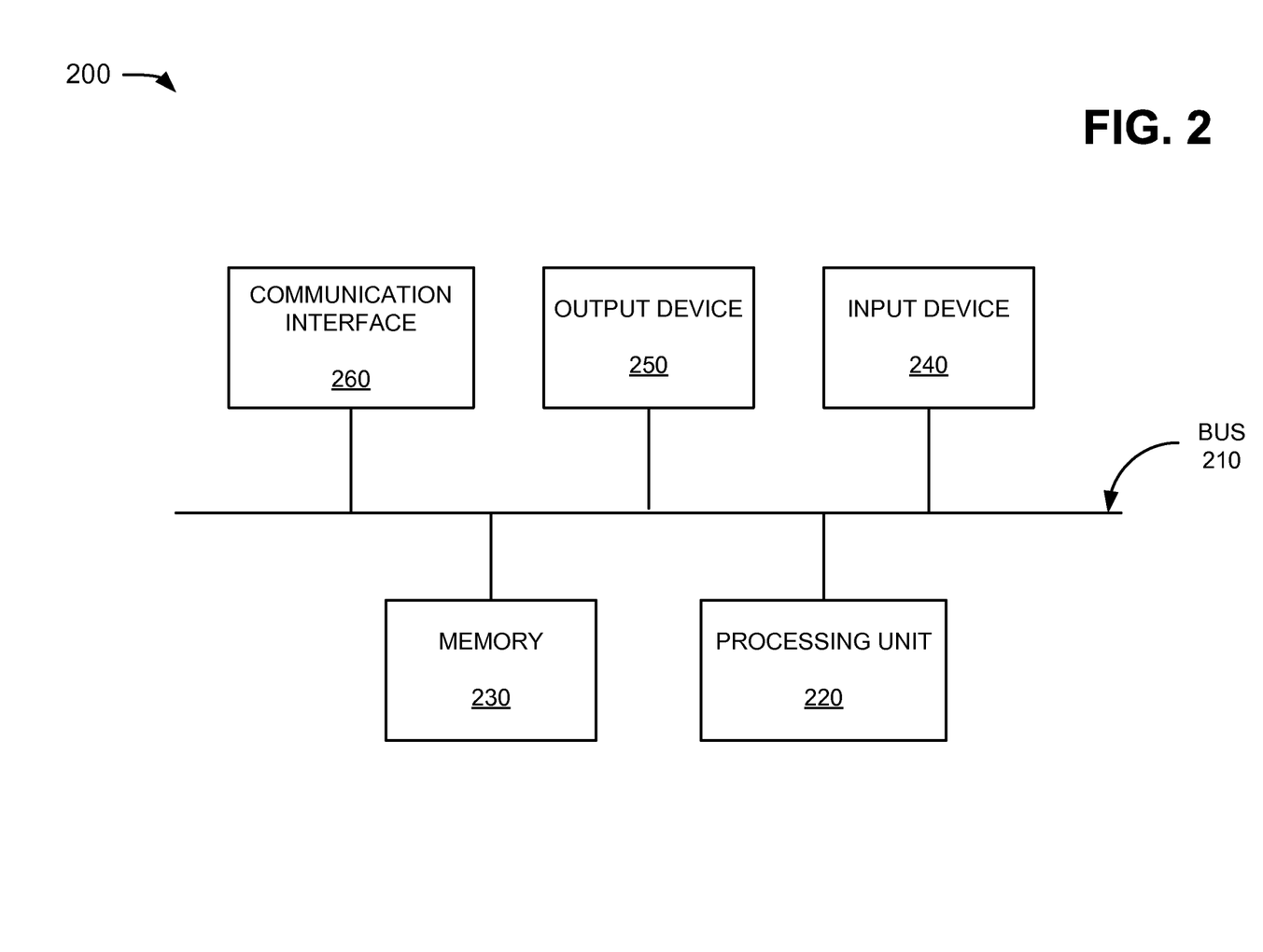
FIG. 2 is a diagram of example components of one or more of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a RAM or another type of dynamic storage device (e.g., a flash memory or a solid state disk drive) that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
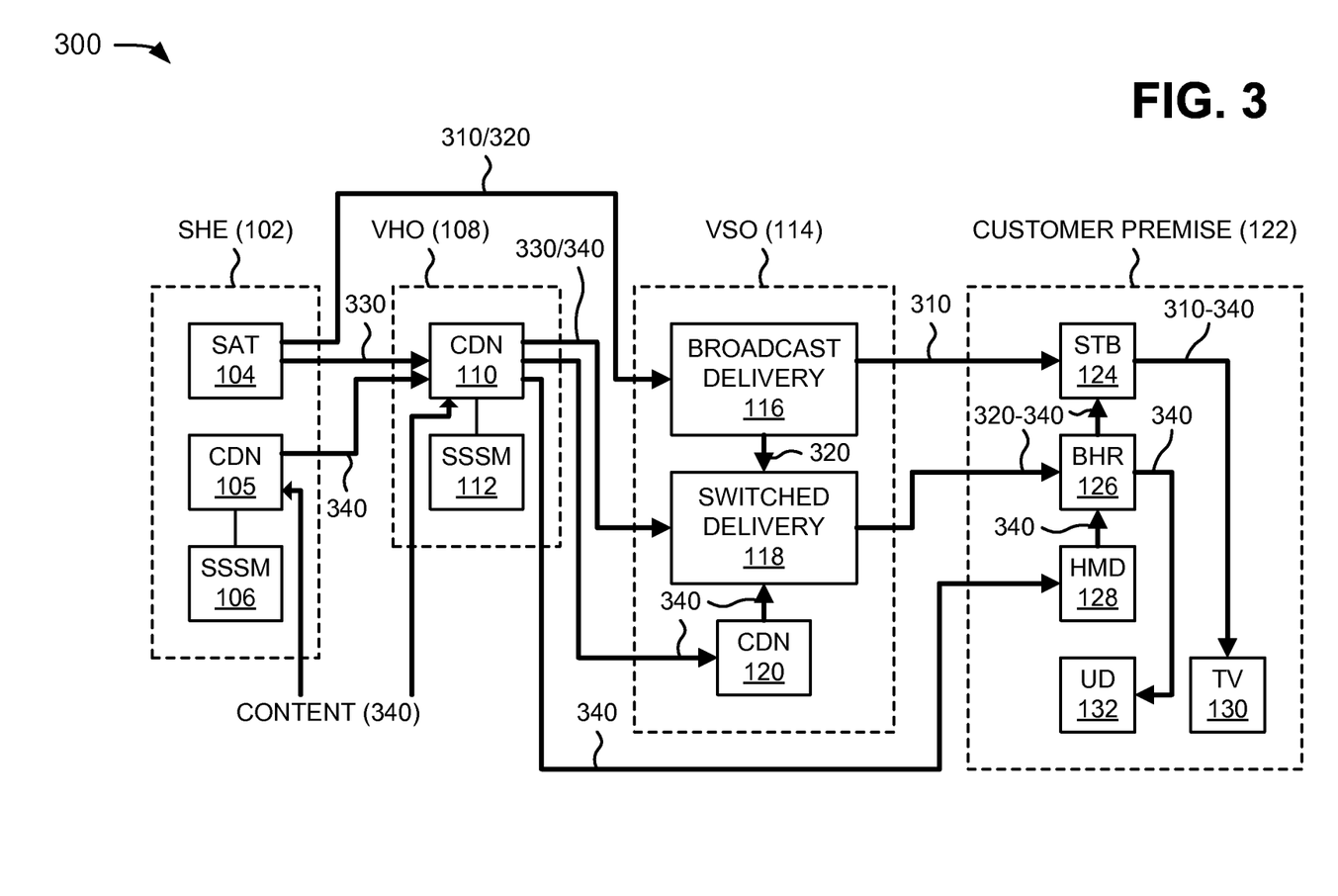
FIG. 3 is a diagram of example interactions between components of an example portion of the network depicted in FIG. 1.

FIG. 3 is a diagram of example interactions between components of an example portion 300 of network 100. As illustrated, example network portion 300 may include SHE 102, satellite dish 104, CDN storage 105, SSSM server 106, VHO 108, CDN storage 110, SSSM server 112, VSO 114, broadcast delivery system 116, switched delivery system 118, CDN storage 120, customer premise 122, STB 124, BHR 126, HMD 128, television (TV) 130, and user device (UD) 132. In one implementation, the components depicted in network portion 300 may include the features described above in connection with one or more of FIGS. 1 and 2.

As further shown in FIG. 3, satellite dish 104 may receive video content 310 (e.g., via reception of satellite transmissions), and may provide video content 310 to broadcast delivery system 116. In one example, video content 310 may include content adhering to quadrature amplitude modulation (QAM) broadcast standards, such as broadcast television. Broadcast delivery system 116 may provide video content 310 to STB 124, and STB 124 may provide video content 310 to television 130. Television 130 may receive video content 310 and may display video content 310 (e.g., to a user).

Satellite dish 104 may receive video content 320 (e.g., via reception of satellite transmissions), and may provide video content 320 to broadcast delivery system 116. In one example, video content 320 may include real time (RT) multicast video content, such as broadcast long-tail IPTV content. Broadcast delivery system 116 may provide video content 320 to switched delivery system 118, switched delivery system 118 may provide video content 320 to BHR 126, and BHR 126 may provide video content 320 to STB 124. STB 124 may provide video content 320 to television 130, and television 130 may display video content 320 (e.g., to a user).

Satellite dish 104 may receive video content 330 (e.g., via reception of satellite transmissions), and may provide video content 330 to CDN storage 110. In one example, video content 330 may include real time (RT) unicast video content, such as VOD content. CDN storage 110 may provide video content 330 to switched delivery system 118, switched delivery system 118 may provide video content 330 to BHR 126, and BHR 126 may provide video content 330 to STB 124. STB 124 may provide video content 330 to television 130, and television 130 may display video content 330 (e.g., to a user).

As further shown in FIG. 3, video content 340 may be provided to CDN storage 105 and/or to CDN storage 110 (e.g., from content providers, not shown). In one example, video content 340 may include best effort (BE) (or higher priority) unicast video content (e.g., OTT content 134), lower effort (LE) (or lower priority) multicast video content, and/or LE unicast video content. In one example implementation, video content 340 may include non-real time video content that is to be delivered during idle time periods of network 100. SSSM server 106 may instruct CDN 105 to provide video content 340 to CDN storage 110. SSSM server 112 may instruct CDN storage 110 to provide video content 340 to switch delivery system 118, CDN storage 120, and/or HMD 128. CDN storage 120 may provide video content 340 to switched delivery system 118. Switched delivery system 118 may provide video content 340 to BHR 126, and BHR 126 may provide video content 340 to STB 124 and/or user device 132 (e.g., for display to a user). STB 124 may provide video content 340 to television 130, and television 130 may display video content 330 (e.g., to a user). HMD 128 may store video content 340 for later retrieval by BHR 126. BHR 126 may retrieve video content 340 from HMD 128, and may provide video content 340 to STB 124. STB 124 may provide video content 340 to television 130, and television 130 may display video content 340 (e.g., to a user). HMD 128 may provide video content 340 to television 130 and/or user device 132 in real time and in a manner that provides security for video content 340.

As described above, network portion 300 may utilize under-the-bottom lower effort (LE) IP transport for non-real time video content 340, and may transmit non-real time video content 340 during idle time periods of network portion 300. During the idle time periods, network portion 300 may have significant capacity available for provision (or transmission) of non-real time video content 340. The non-real time video content 340 may be broadcast, in real time, at customer premise 122 (e.g., the next day). In one implementation, if network portion 300 detects network congestion (e.g., using a congestion notification), network portion 300 may reduce or cease provision (or transmission) of non-real time video content 340.

The under-the-bottom delivery of non-real time video content 340 may make better use of existing resources in network portion 300. In one example implementation, network portion 300 may charge for the amount of non-real time video content 340 that is transported (rather than how quickly it is transported), and may schedule delivery of non-real time video content 340 to maximize for off-peak network utilization and/or charges less for this (e.g., which may be important in lower bandwidth networks).

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
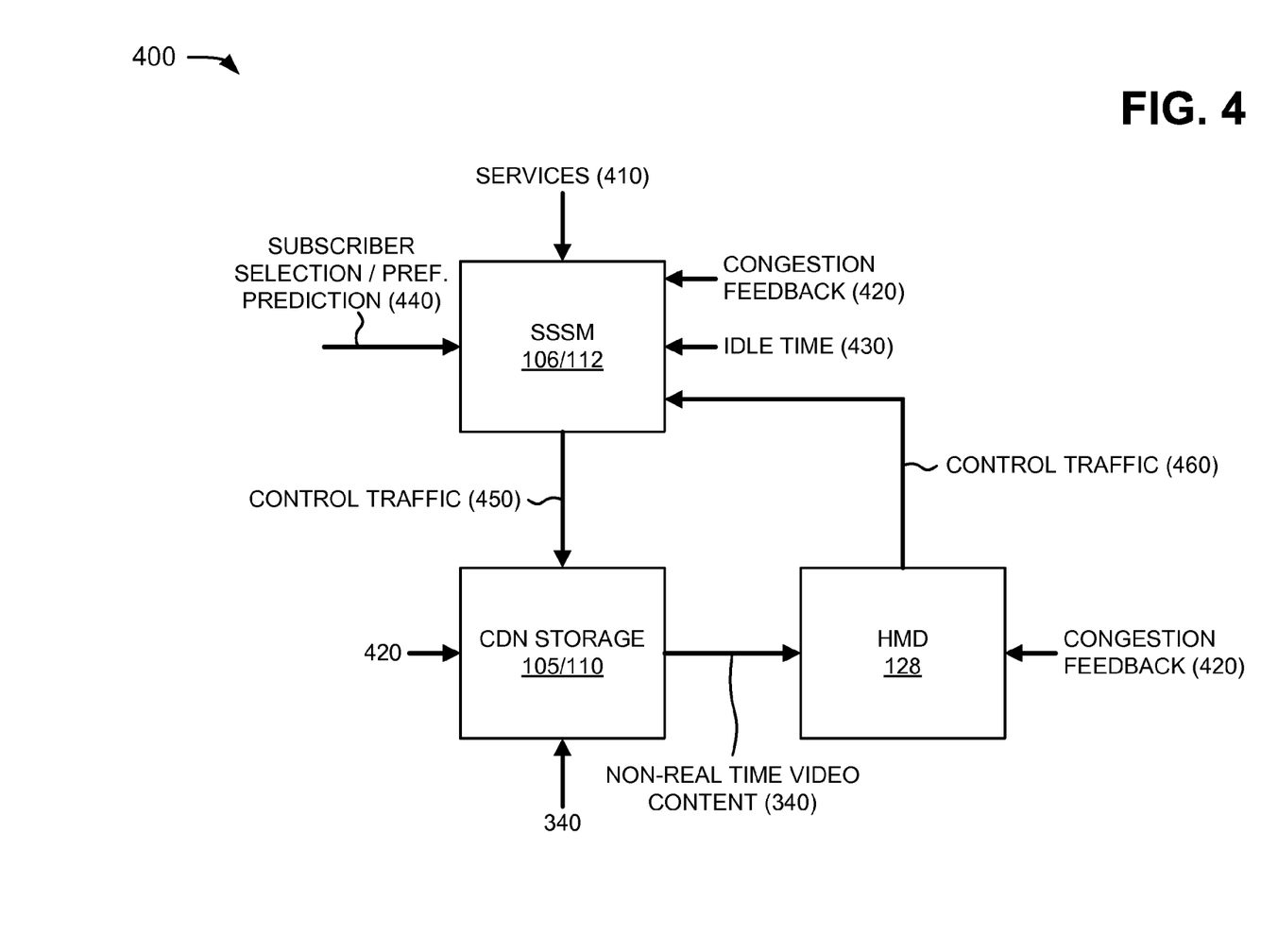
FIG. 4 is a diagram of example interactions between components of another example portion of the network depicted in FIG. 1.

FIG. 4 is a diagram of example interactions between components of another example portion 400 of network 100. As illustrated, example network portion 400 may include SSSM servers 106/112, CDN storage 105/110, and HMD 128. In one implementation, SSSM servers 106/112, CDN storage 105/110, and HMD 128 may include the features described above in connection with one or more of FIGS. 1-3.

In one example implementation, network portion 400 may provide under-the-bottom time-shifted delivery of video content to customer premises equipment. Network portion 400 may accomplish this by deploying SSSM servers (e.g., SSSM servers 106/112) and CDN storage (e.g., CDN storage 105/110) in SHE 102 and VHO 108.

As shown in FIG. 4, SSSM servers 106/112 may include services 410 (e.g., load balancing, direct server return functions, etc.) that enable SSSM servers 106/112 to provide the functionality described herein. SSSM servers 106/112 may receive congestion feedback information 420 and idle time information 430, and may determine whether to instruct CDN storage 105/110 to forward non-real time video content 340 based on information 420 and/or 430. CDN storage 105/110 may also receive congestion feedback information 420. Congestion feedback information 420 may include information associated with usage (e.g., congested, low traffic, medium traffic, etc.) of network 100. Idle time information 430 may include historical information of traffic patterns associated with network 100 (e.g., so idle network times may be identified), quasi-static measurements from components of network 100, and/or network 100 state information. In one example, if SSSM servers 106/112 detect network congestion (e.g., based on congestion feedback information 420), SSSM servers 106/112 may cause CDN storage 105/110 to reduce or cease provision (or transmission) of non-real time video content 340. In another example, if SSSM servers 106/112 identify a time period (e.g., from 1:00 AM to 3:00 AM) as a time of little usage of network 100, SSSM servers 106/112 may instruct CDN storage 105/110 to provide non-real time video content 340 during this time period.

As further shown in FIG. 4, SSSM servers 106/112 may use a hierarchy of network-based content storage (e.g., CDN storage 105/110) for non-real time video content 340 based on subscriber selection or preference prediction information 440. Information 440 may include historical subscriber selections of non-real time video content, predications of subscriber preferences associated with non-real time video content, etc. HMD 128 and/or SSSM servers 106/112 may control (e.g., schedule, adjust a long term transfer rate, choose unicast/multicast, etc.) traffic (e.g., non-real time video content 340) provided from CDN storage 105/110 to HMD 128 based on information 440, as indicated by reference number 450.

As described above, HMD 128 may be deployed at customer premise 122 for storing non-real time video content 340. In one implementation, HMD 128 may store commercials and extended advertising media, and may synchronize this content with times at which the content is to be viewed (e.g., via television 130). HMD 128 may include a new external device, a customer purchased unit, or an add-on appliance provided at customer premise 122. Alternatively, or additionally, non-real time video content 340 may be stored in low cost network-based storage, commercial processors, at VSO 114 (e.g., for the most popular content), etc. Local storage of non-real time video content 340 may relieve network portion 400 of quality of service (QoS) requirements for real time delivery. In one example implementation, HMD 128 may be omitted from network portion 400, and non-real time video content 340 may be stored in various devices (e.g., a music player, a DVD player, a television, a computer, etc.) located at customer premise 122, but may be accessed by any other device located at customer premise 122. For example, user device 132 may store non-real time video content 340, and television 130 may retrieve content 340 from user device 132. As further shown in FIG. 4, HMD 128 may receive congestion feedback information 420, and may schedule delivery (e.g., with SSSM servers 106/112) of content 340 (i.e., may control traffic 460) based on congestion feedback information 420.

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

Figure 5:
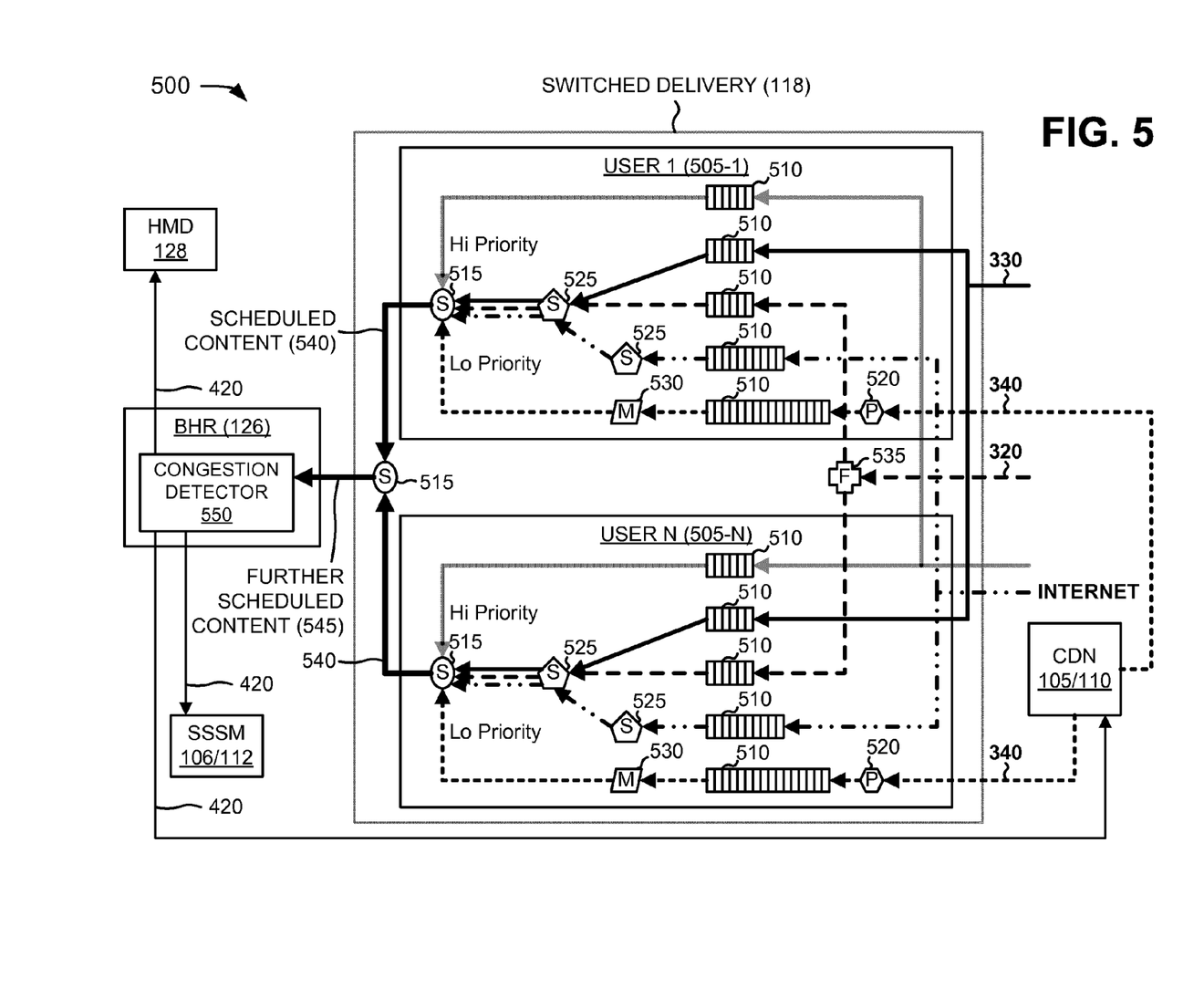
FIG. 5 is a diagram of example functional components of a switched delivery system of the network depicted in FIG. 1.

FIG. 5 is a diagram of example functional components of switched delivery system 118. In one implementation, the functions described in connection with FIG. 5 may be performed by one or more components of device 200 (FIG. 2). As shown in FIG. 5, switched delivery system 118 may include multiple user components 505-1, . . . , 505-N (collectively referred to herein as "user components 505," and singularly as "user component 505") that include admit queues 510, scheduling logic 515, policing logic 520, shaping logic 525, and marking logic 530; and may also include forwarding logic 535.

User component 505 may include hardware or a combination of hardware and software that may receive different types of content (e.g., video content, voice content, data, etc.), and may schedule the different types of content for delivery to a corresponding subscriber (e.g., to a customer premise associated with a subscriber). For example, as shown in FIG. 5, user components 505 may receive video content 320 (e.g., IPTV content), video content 330 (e.g., VOD content), non-real time video content 340 from CDN storage 105/110, voice content (e.g., VoIP content), Internet content (e.g., data), etc.

Admit queues 510 may include hardware or a combination of hardware and software that may receive and store the different types of content in a particular order. In one implementation, admit queues 510 may be used to prioritize the different types of content (e.g., low priority, high priority, etc.) so that the different types of content may be scheduled for delivery to a corresponding subscriber.

Scheduling logic 515 may include hardware or a combination of hardware and software that may receive the different types of content (e.g., as prioritized by admit queues 510), and may schedule the content for delivery to a corresponding subscriber.

Policing logic 520 may include hardware or a combination of hardware and software that may provide network security features (e.g., filtering, firewall capability, etc.) for the different types of content.

Shaping logic 525 may include hardware or a combination of hardware and software that may receive the different types of content and may apply traffic shaping to the content. For example, shaping logic 525 may apply traffic shaping to the content in order to optimize or guarantee performance of the content, improve latency, and/or increase usable bandwidth (e.g., by delaying content that meets certain criteria).

Marking logic 530 may include hardware or a combination of hardware and software that may apply traffic marking to the different types of content. Marking the different types of content may enable attributes for the content (e.g., belonging to a specific class or category) to be set or modified.

Forwarding logic 535 may include hardware or a combination of hardware and software that may receive a particular one of the different types of content, and may provide multicast replication for the particular content.

As further shown in FIG. 5, the voice content may be provided to first admit queues 510 (e.g., the first from the top), and the first admit queues 510 may forward the voice content to scheduling logic 515. Video content 330 (e.g., VOD content) may be provided to second admit queues 510 (e.g., the second from the top), and the second admit queues 510 may provide video content 330 to a first shaping logic 525. Video content 320 (e.g., IPTV content) may be provided to forwarding logic 535, and forwarding logic 535 may provide video content 320 to third admit queues 510 (e.g., the third from the top). The third admit queues 510 may provide video content 320 to the first shaping logic 525. The Internet content may be provided to fourth admit queues 510 (e.g., the fourth from the top), and the fourth admit queues 510 may provide the Internet content to a second shaping logic 535 (e.g., for traffic shaping). The second shaping logic 535 may provide the shaped Internet content to the first shaping logic 535. CDN storage 105/110 may provide video content 340 (e.g., non-real time video content) to policing logic 520 (e.g., for filtering), and policing logic 520 may provide the filtered video content 340 to fifth admit queues 510 (e.g., the fifth from the top). The fifth admit queues 510 may provide the filtered video content 340 to marking logic 530 (e.g., for traffic marking), and marking logic 530 may provide the filtered/marked video content 340 to scheduling logic 515.

The first shaping logic 525 may receive video content 320/330 and the Internet content, and may apply traffic shaping to video content 320/330 and the Internet content. The first shaping logic 525 may provide the shaped video content 320/330 and Internet content to scheduling logic 515. Each scheduling logic 515 (e.g., of user components 505) may receive video content 320-340, the voice content, and the Internet content, and may schedule the content for ultimate delivery to BHR 126, as indicated by reference number 540. Each scheduling logic 515 may provide scheduled content 540 to another scheduling logic 515 (e.g., of switched delivery system 118), and the other scheduling logic 515 may further schedule content 540 for delivery to BHR 126, as indicated by reference number 545. The other scheduling logic 515 may forward scheduled content 545 to BHR 126 (e.g., pursuant to a schedule determined by the other scheduling logic 515). BHR 126 may forward scheduled content 545 (e.g., pursuant to the schedule) to one or more devices provided at customer premise 122 (e.g., STB 124, HMD 128, user device 132, etc.). The net effect of the aforementioned queuing and scheduling logic may be to enable a bandwidth scavenger type of service (also called a lower effort service) that defers transmission in the event of any other traffic of higher priority.

As further shown in FIG. 5, BHR 126 may include a congestion detector 550 that may receive scheduled content 545 from the other scheduling logic 515, and may generate congestion feedback information 420 based on scheduled content 545. Congestion detector 550 may provide congestion feedback information 420 to SSSM servers 106/112, CDN storage 105/110, and/or HMD 128. In one example implementation, congestion feedback information 420 may be used by SSSM servers 106/112, CDN storage 105/110, and/or HMD 128 to determine when, how much, etc. non-real time video content may be delivered in network 100. Congestion detector 550 may implement a variety of congestion control methods (e.g., to generate congestion feedback information 420), such as an explicit congestion notification (ECN) method, a pre-congestion notification (PCN) method, a re-inserted feedback ECN (re-ECN) method, a low extra delay background transport (ledbat) method, a congestion exposure (conex) method, etc.

In the ECN method, the ECN may be negotiated between network endpoints (e.g., switched delivery system 118 and BHR 126), and an ECN-aware device may set an IP header bit in a packet (e.g., instead of dropping the packet) to signal the beginning of congestion in a network (e.g., network 100). A packet receiver may echo the congestion indication to a packet sender, and the packet sender may react as if the packet was dropped.

In the PCN method, PCN threshold rates may be configured on edge and backbone links in a trusted domain, and a network device (e.g., BHR 126) may compare actual packet rates to the PCN threshold rates, and may mark packets that exceed the PCN threshold rates. A destination network device (e.g., BHR 126) may return congestion feedback (e.g., congestion feedback 420) to a source network device (e.g., SSSM servers 106/112). The source network device may police traffic based on flow rate, may determine whether new PCN flows can be admitted, may terminate existing PCN flows (e.g., in case of extreme congestion), etc. The re-ECN method may function similar to the PCN method, but in a non-trusted domain rather than in a trusted domain. In the ledbat method, ECN measurements or application layer latency measurements may be used to provide congestion feedback to "bandwidth scavenger" applications.

FIGS. 6-10 are flow charts of an example process 600 for providing under-the-bottom time-shifted delivery of video content according to implementations described herein. In one implementation, process 600 may be performed by one or more devices of SHE 102 (e.g., CDN storage 105 and SSSM server 106) and/or VHO 108 (e.g., CDN storage 110 and SSSM server 112). In another implementation, some or all of process 600 may be performed by another device or group of devices, including or excluding one or more devices of SHE 102 and/or VHO 108.

Figure 6:
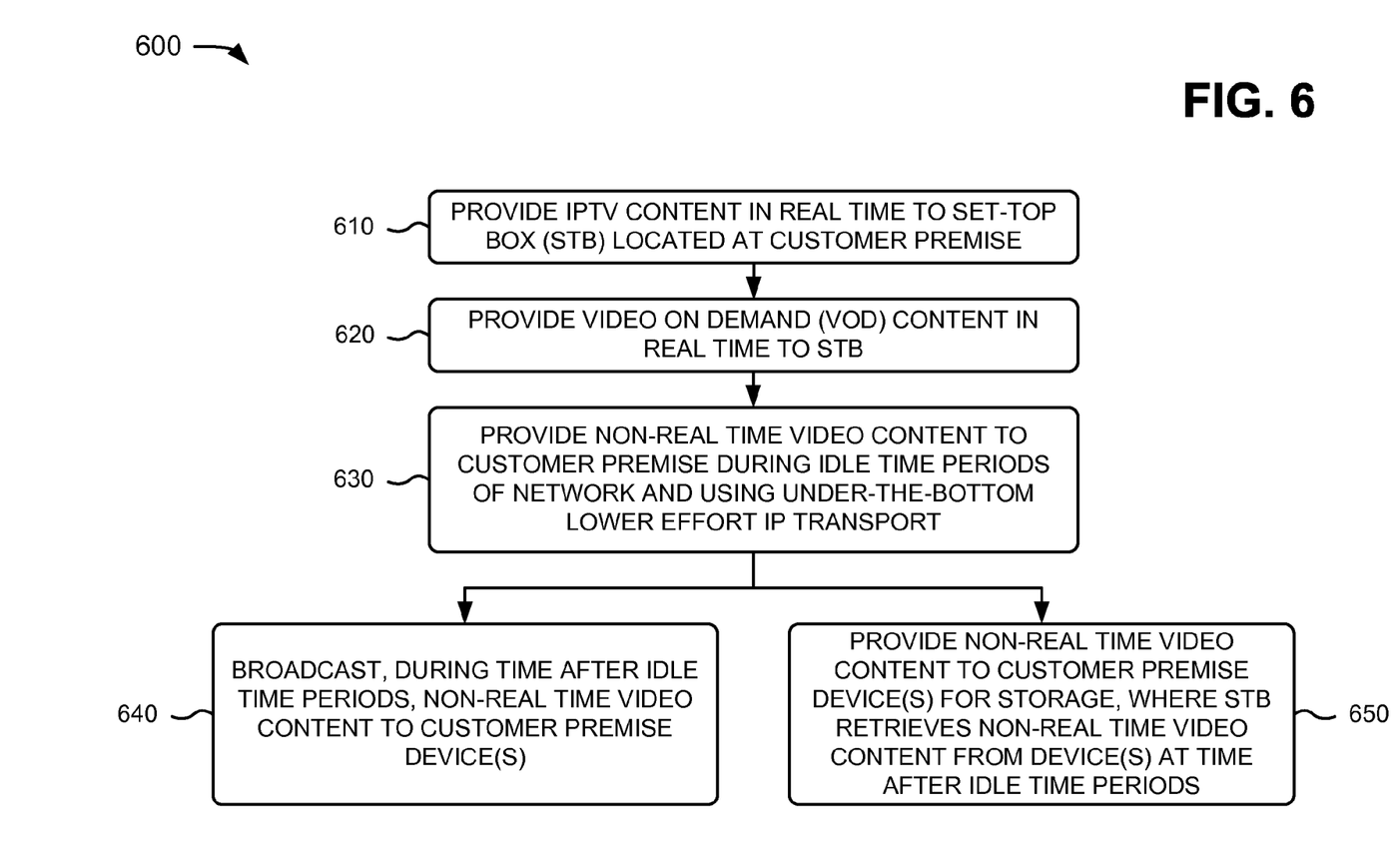
FIGS. 6-10 are flow charts of an example process for providing under-the-bottom time-shifted delivery of video content according to implementations described herein.

As illustrated in FIG. 6, process 600 may include providing IPTV content in real time to a set-top box (STB) located at a customer premise (block 610). For example, in implementations described above in connection with FIG. 3, satellite dish 104 may receive video content 320 (e.g., via reception of satellite transmissions), and may provide video content 320 to broadcast delivery system 116. In one example, video content 320 may include real time (RT) multicast video content, such as broadcast long-tail IPTV content. Broadcast delivery system 116 may provide video content 320 to switched delivery system 118, switched delivery system 118 may provide video content 320 to BHR 126, and BHR 126 may provide video content 320 to STB 124.

As further shown in FIG. 6, process 600 may include providing video on demand (VOD) content in real time to the STB (block 620). For example, in implementations described above in connection with FIG. 3, satellite dish 104 may receive video content 330 (e.g., via reception of satellite transmissions), and may provide video content 330 to CDN storage 110. In one example, video content 330 may include real time (RT) unicast video content, such as VOD content. CDN storage 110 may provide video content 330 to switched delivery system 118, switched delivery system 118 may provide video content 330 to BHR 126, and BHR 126 may provide video content 330 to STB 124.

Returning to FIG. 6, process 600 may include providing non-real time video content to the customer premise during idle time periods of a network and using under-the-bottom lower effort IP transport (block 630). For example, in implementations described above in connection with FIG. 3, video content 340 may be provided to CDN storage 105 and/or to CDN storage 110 (e.g., from content providers, not shown). In one example, video content 340 may include best effort (BE) (or higher priority) unicast video content (e.g., OTT content 134), lower effort (LE) (or lower priority) multicast video content, and/or LE unicast video content. In another example, video content 340 may include non-real time video content that is to be delivered during idle time periods of network 100. SSSM server 106 may instruct CDN 105 to provide video content 340 to CDN storage 110. SSSM server 112 may instruct CDN storage 110 to provide video content 340 to switch delivery system 118, CDN storage 120, and/or HMD 128. CDN storage 120 may provide video content 340 to switched delivery system 118. Switched delivery system 118 may provide video content 340 to BHR 126, and BHR 126 may provide video content 340 to STB 124 and/or user device 132 (e.g., for display to a user). STB 124 may provide video content 340 to television 130, and television 130 may display video content 330 (e.g., to a user).

As further shown in FIG. 6, process 600 may include broadcasting, during a time after the idle time periods, the non-real time video content to customer premise device(s) (block 640) and/or providing the non-real time video content to the customer premise device(s) for storage, where the STB retrieves the non-real time video content from the customer premise device(s) at a time after the idle time periods (block 650). For example, in implementations described above in connection with FIG. 3, BHR 126 may provide video content 340 to STB 124 and/or user device 132 (e.g., for display to a user) at a time after the idle time periods of network 100. STB 124 may provide video content 340 to television 130 at a time after the idle time periods of network 100, and television 130 may display video content 330 (e.g., to a user). HMD 128 may store video content 340 for later retrieval by STB 124/BHR 126. For example, BHR 126 may retrieve video content 340 from HMD 128, and may provide video content 340 to STB 124 at a time after the idle time periods of network 100. STB 124 may provide video content 340 to television 130, and television 130 may display video content 340 (e.g., to a user).

Figure 7:
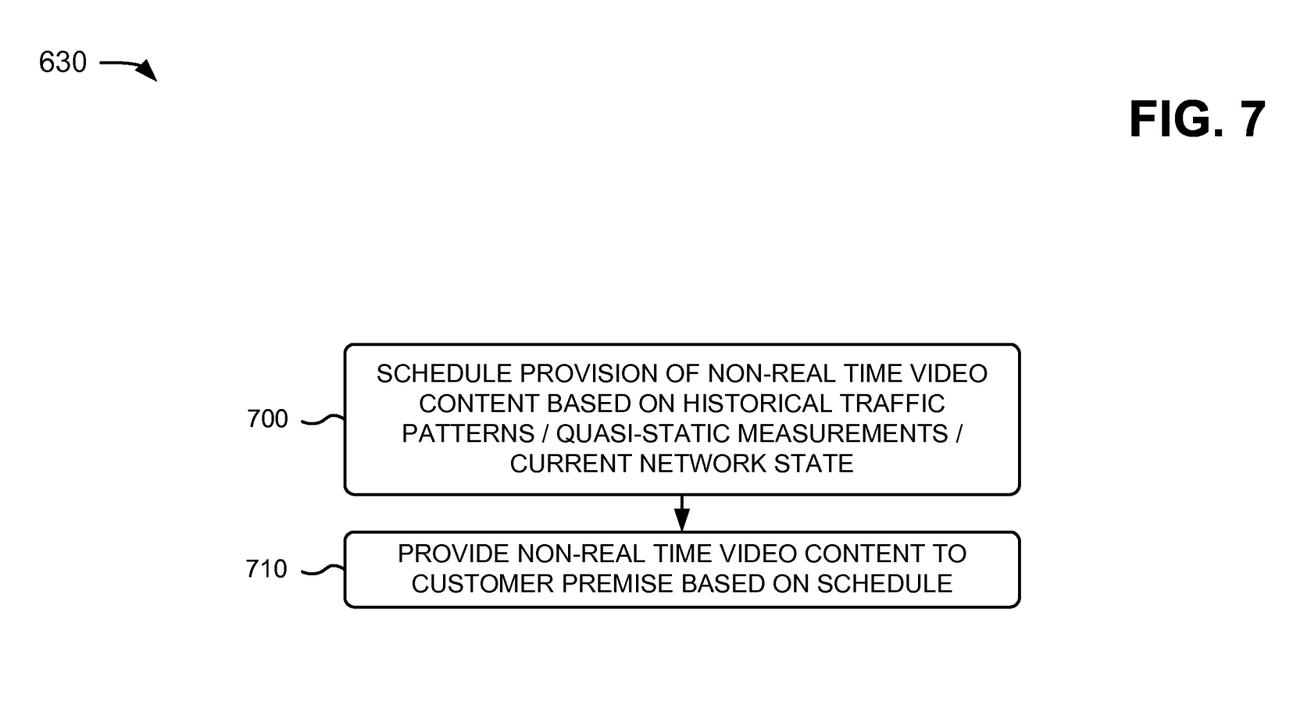

Process block 630 may include the process blocks depicted in FIG. 7. As shown in FIG. 7, process block 630 may include scheduling provision of the non-real time video content based on historical traffic patterns, quasi-static measurements, and current network state (block 700), and providing the non-real time video content to the customer premise based on the schedule (block 710). For example, in implementations described above in connection with FIG. 4, SSSM servers 106/112 may receive congestion feedback information 420 and idle time information 430, and may determine whether to instruct CDN storage 105/110 to forward non-real time video content 340 based on information 420 and/or 430. Idle time information 430 may include historical information of traffic patterns associated with network 100 (e.g., so idle network times may be identified), quasi-static measurements from components of network 100, and/or network 100 state information.

Figure 8:
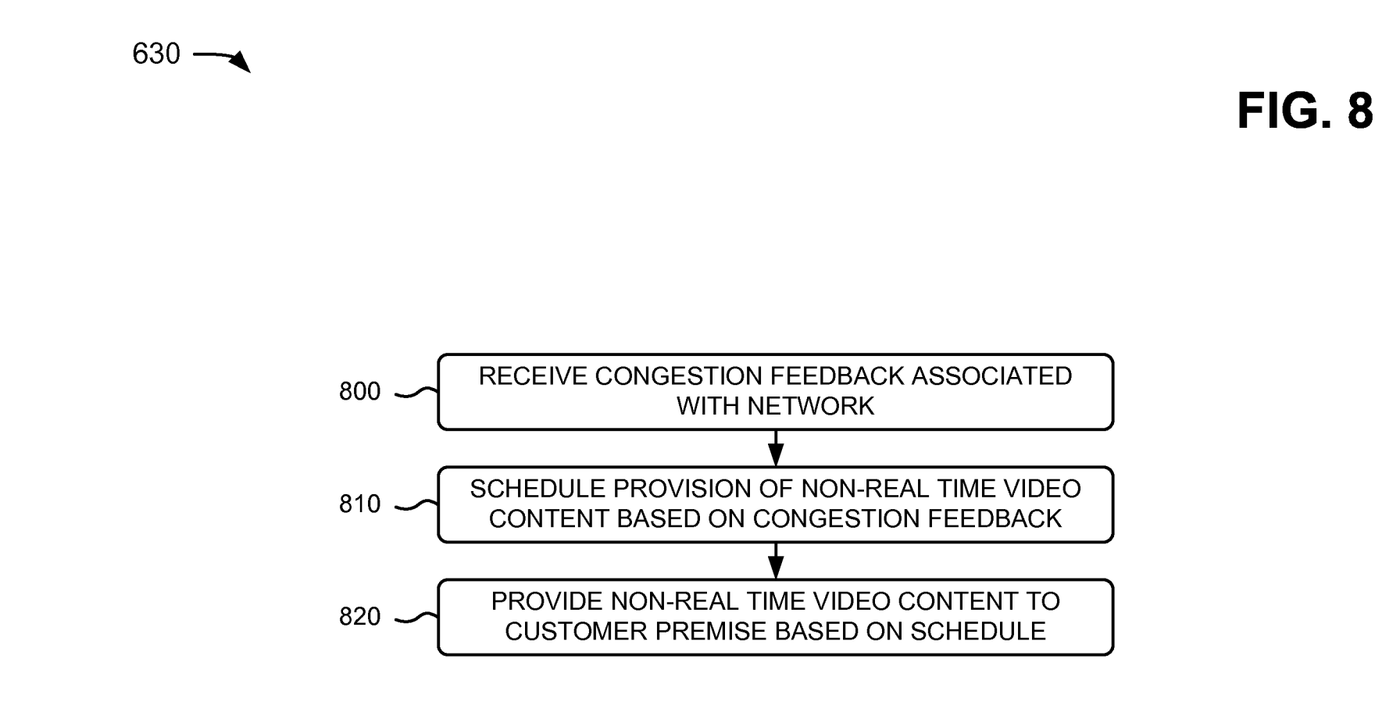

Alternatively, or additionally, process block 630 may include the process blocks depicted in FIG. 8. As shown in FIG. 8, process block 630 may include receiving congestion feedback associated with the network (block 800), scheduling provision (or transmission) of the non-real time video content based on the congestion feedback (block 810), and providing the non-real time video content to the customer premise based on the schedule (block 820). For example, in implementations described above in connection with FIG. 4, CDN storage 105/110 and/or SSSM servers 106/112 may receive congestion feedback information 420 and idle time information 430, and may determine whether to instruct CDN storage 105/110 to forward non-real time video content 340 based on information 420 and/or 430. Congestion feedback information 420 may include information associated with usage (e.g., congested, low traffic, medium traffic, etc.) of network 100. In one example, if CDN storage 105/110 and/or SSSM servers 106/112 detect network congestion (e.g., based on congestion feedback information 420), CDN storage 105/110 and/or SSSM servers 106/112 may reduce or cease provision (or transmission) of non-real time video content 340. In another example, if CDN storage 105/110 and/or SSSM servers 106/112 identify a time period (e.g., from 1:00 AM to 3:00 AM) as a time of little usage of network 100, SSSM servers 106/112 may request provision (or transmission) of non-real time video content 340 during this time period.

Figure 9:
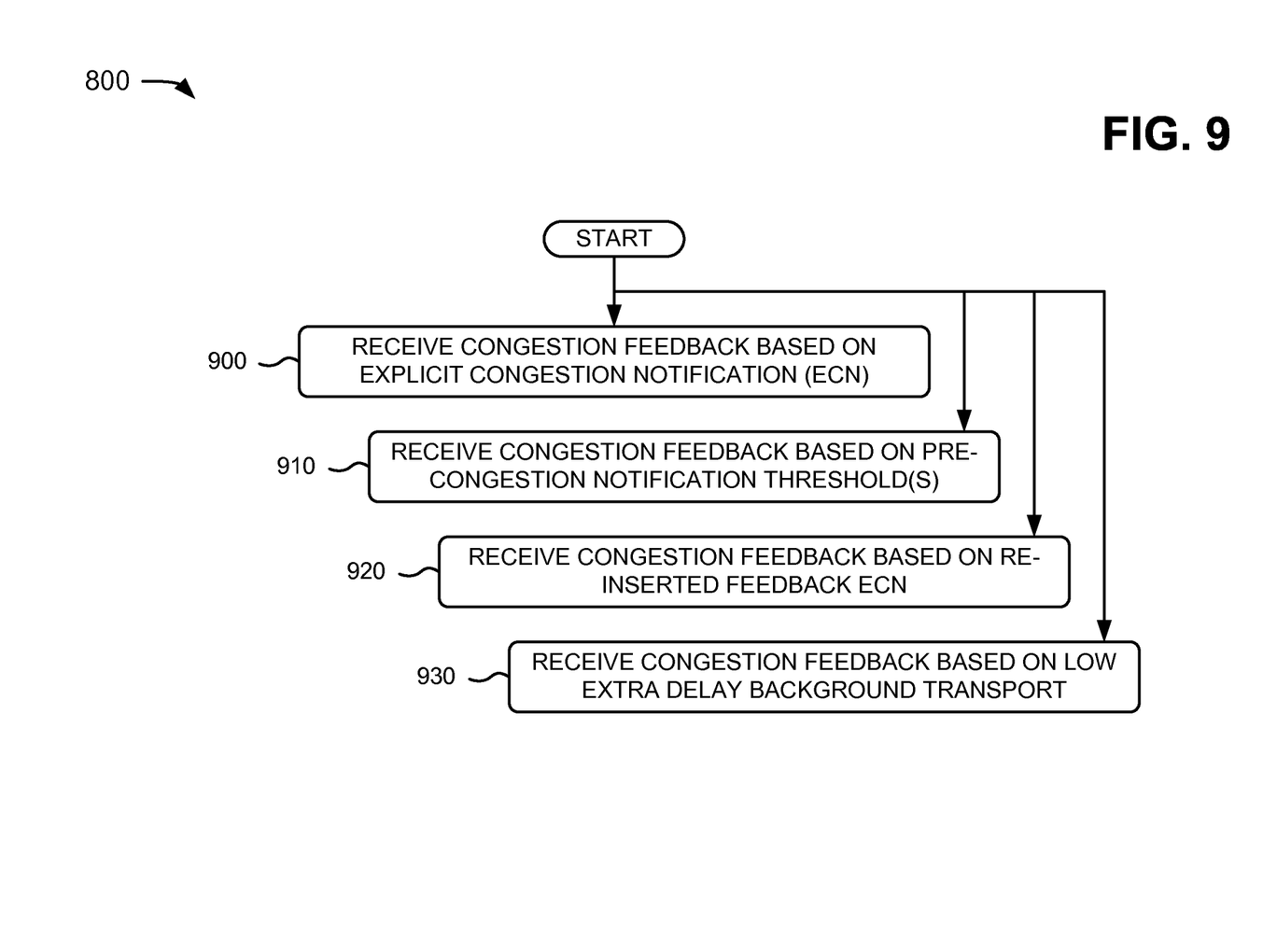

Process block 800 may include the process blocks depicted in FIG. 9. As shown in FIG. 9, process block 800 may include one of receiving congestion feedback based on an explicit congestion notification (ECN) method (block 900), receiving congestion feedback based on a pre-congestion notification (PCN) thresholds method (block 910), receiving congestion feedback based on a re-inserted feedback ECN method (block 920), or receiving congestion feedback based on a low extra delay background transport (ledbat) method (block 930). For example, in implementations described above in connection with FIG. 5, congestion detector 550 may implement a variety of congestion control methods (e.g., to generate congestion feedback information 420), such as an ECN method, a PCN method, a re-inserted feedback ECN (re-ECN) method, a low extra delay background transport (ledbat) method, etc. In the ECN method, the ECN may be negotiated between network endpoints (e.g., switched delivery system 118 and BHR 126), and an ECN-aware device may set an IP header bit in a packet (e.g., instead of dropping the packet) to signal the beginning of congestion in a network (e.g., network 100). In the PCN method, PCN threshold rates may be configured on edge and backbone links in a trusted domain, and a network device (e.g., BHR 126) may compare actual packet rates to the PCN threshold rates, and may mark packets that exceed the PCN threshold rates. The re-ECN method may function similar to the PCN method, but in a non-trusted domain rather than in a trusted domain. In the ledbat method, ECN measurements or application layer latency measurements may be used to provide congestion feedback to "bandwidth scavenger" applications.

Figure 10:
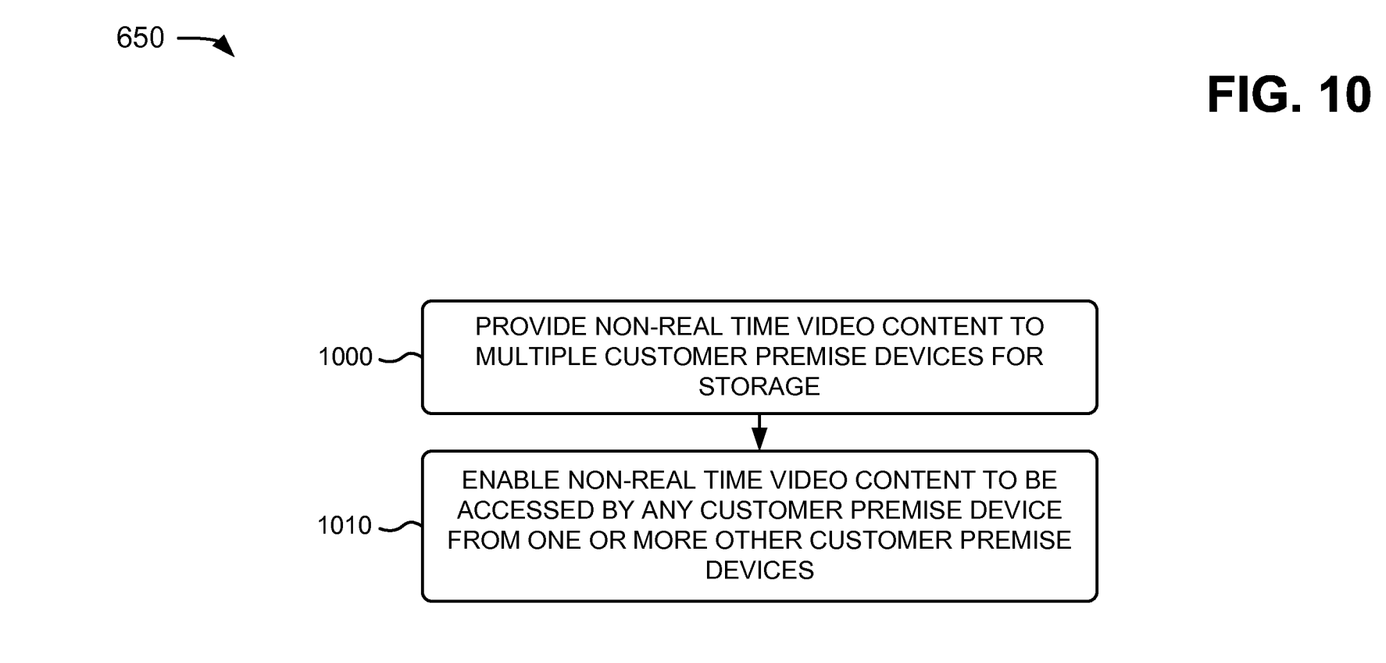

Process block 650 may include the process blocks depicted in FIG. 10. As shown in FIG. 10, process block 650 may include providing the non-real time video content to multiple customer premise devices for storage (block 1000), and enabling the non-real time video content to be accessed by any customer premise device from one or more other customer premise devices (block 1010). For example, in implementations described above in connection with FIG. 4, non-real time video content 340 may be stored in various devices (e.g., a music player, a DVD player, a television, a computer, etc.) located at customer premise 122, but may be accessed by any other device located at customer premise 122. For example, user device 132 may store non-real time video content 340, and television 130 may retrieve content 340 from user device 132.

Systems and/or methods described herein may provide under-the-bottom time-shifted delivery of video content. For example, the systems and/or methods may download and store non-real time video content (e.g., pre-recorded video content, previous television episodes, media-oriented advertisements, etc.) at a customer premise. In one implementation, the systems and/or methods may store the non-real time video content in a large storage device (e.g., a home media device) provided at the customer premise. In other implementations, the systems and/or methods may store the non-real time video content in one or more customer premise devices (e.g., DVRs, televisions, computers, etc.), and may enable the video content to be accessed by any device within the customer premise. The systems and/or methods may download the non-real time video content during idle network times and using lower bandwidth access (e.g., wireless access), and could use P4P for local redistribution of popular or missed content.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   providing, by a super head end (SHE) or a video hub office (VHO) of a content delivery network (CDN), a real time video content to customer premise devices located at a customer premise, wherein the SHE and the VHO are not located at the customer premise;
   providing, by the SHE or the VHO of the CDN and using lower effort Internet protocol (IP) transport, a non-real time video content to one of the customer premise devices during idle time periods, wherein the one of the customer premise devices is a storage device,
   wherein providing the non-real time video content includes:
     receiving, at the SHE or the VHO, congestion feedback information associated with the CDN from a router located in a local area network of the customer premise;
   determining, by the SHE or VHO, a schedule for providing the non-real time video content based on the congestion feedback information received from the router located in the local area network of the customer premise; and
   providing, by the SHE or the VHO, the non-real time video content to the one of the customer premise devices based on the determined schedule,
   wherein the storage device is associated with the router and the storage device stores the non-real time video content, and
   wherein a set-top box retrieves the non-real time video content from the storage device via the router at a particular time after the idle time periods.

2. The method of claim 1, wherein the providing the real time video content includes:
   providing Internet protocol television (IPTV) content to the customer premise devices; and
   providing video on demand (VOD) content to the customer premise devices.

3. The method of claim 1, wherein:
   the non-real time video content is provided to multiple customer premise devices for storage, and
   a customer premise device retrieves, in real time, the non-real time video content from one or more other customer premise devices.

4. The method of claim 1, wherein the determining the schedule for providing the non-real time video content is further based on one or more of:
   historical traffic patterns of the CDN,
   quasi-static measurements associated with the CDN, or
   a current network state.

5. The method of claim 1, wherein the non-real time video content includes one or more of:
   over the top (OTT) video content,
   Internet protocol (IP) unicast video content,
   pre-recorded video content,
   previous television episodes, or
   advertisements.

6. The method of claim 1, wherein the router located in the local area network of the customer premise comprises a broadband home router (BHR).

7. The method of claim 1, wherein receiving, at the SHE or the VHO from the router located in the local area network of the customer premise, the congestion feedback information includes one or more of:
   receiving the congestion feedback information based on a pre-congestion notification (PCN) method,
   receiving the congestion feedback information based on a re-inserted feedback explicit congestion notification (ECN) method, or
   receiving the congestion feedback information based on a low extra delay background transport (ledbat) method.

8. A video hub office (VHO) or a super head end (SHE) coupled to a content delivery network (CDN), comprising:
   storage configured to store first video content and second video content; and
   a server configured to:

provide the first video content to one or more devices located at a customer premise via a router located in a local area network of the customer premise, receive congestion feedback information associated with the CDN from the router located in the local area network of the customer premise, determine idle time periods associated with the CDN based on the congestion feedback information received from the router located in the local area network of the customer premise, and provide the second video content to at least one of the one or more devices via the router during the determined idle time periods associated with the CDN using lower effort network transport for broadcast of the second video content by the at least one of the devices at a time after the idle time periods, wherein the at least one of the devices is a storage device, wherein the SHE and the VHO are not located at the customer premise, and wherein the storage device is associated with the router and the storage device stores the second video content, and wherein a set-top box retrieves the second video content from the storage device via the router at a particular time after the idle time periods.

9. The VHO or the SHE of claim 8, wherein, when providing the first video content, the server is further configured to:
provide Internet protocol television (IPTV) content to the set-top box,
provide broadcast television content to the set-top box, or
provide video on demand (VOD) content to the set top box.

10. The VHO or the SHE of claim 8, wherein:
the second video content is provided to multiple devices at the customer premise for storage, and
a device retrieves the second video content from one or more of the multiple devices at the customer premise.

11. The VHO or the SHE of claim 8, wherein the server is further configured to:
determine a schedule for providing the second video content based on one or more of:
historical traffic patterns of the CDN,
quasi-static measurements associated with the CDN, or
a current network state, and
provide the second video content to the at least one of the devices at the customer premise further based on the determined schedule.

12. The VHO or the SHE of claim 8, wherein the server is further configured to:
determine a schedule for providing the second video content based on the congestion feedback information, and
provide the second video content to the at least one of the devices at the customer premise further based on the determined schedule.

13. The VHO or the SHE of claim 8, wherein the second video content includes one or more of:
over the top (OTT) video content,
Internet protocol (IP) unicast video content,
pre-recorded video content,
previous television episodes, or
advertisements.

14. The VHO or SHE of claim 8, wherein the router located in the local area network of the customer premise comprises a broadband home router (BHR).

15. The VHO or the SHE of claim 8, wherein the congestion feedback information is received at the server from the router located in the local area network of the customer premise based on one or more of:
a pre-congestion notification (PCN) method,
a re-inserted feedback explicit congestion notification (ECN) method, or
a low extra delay background transport (ledbat) method.

16. A system, comprising:
one or more devices, comprising a video hub office (VHO) or a super head end (SHE), configured to:
provide a real time video content to one or more customer premise devices located at a customer premise of a content delivery network (CDN) via a broadband home router located in a local area network of the customer premise, receive congestion feedback information associated with the CDN from the broadband home router located in the local area network of the customer premise, determine a schedule for providing a non-real time video content based on the congestion feedback information received from the broadband home router located in the local area network of the customer premise, and provide, based on the determined schedule and using lower effort Internet protocol (IP) transport, the non-real time video content to one of the one or more customer premise devices during idle time periods associated with the CDN for broadcast of the non-real time video content at a time after the idle time periods to the one of the customer premise devices, wherein the one of the customer premise devices is a storage device, wherein the SHE and the VHO are not located at the customer premise, wherein the storage device is associated with the broadband home router and the storage device stores the non-real time video content, and wherein a set-top box retrieves the non-real time video content from the storage device via the broadband home router at a particular time after the idle time periods.

17. The system of claim 16, wherein, when providing the real time video content, the one or more devices are configured to:
provide Internet protocol television (IPTV) content to the customer premise devices; and
provide video on demand (VOD) content to the one or more customer premise devices.

18. The system of claim 16, wherein:
the non-real time video content is provided to multiple customer premise devices for storage, and
a customer premise device retrieves, in real time, the non-real time video content from one or more other customer premise devices.

19. The system of claim 16, wherein when the one or more devices determine the schedule for providing the non-real time video content, the one or more devices determine the schedule further based on one or more of:
historical traffic patterns of the CDN,
quasi-static measurements associated with the CDN, or
a current network state.

20. The system of claim 16, wherein the congestion feedback information is received at the devices from the broadband home router located in the local area network of the customer premise based on one or more of:
a pre-congestion notification (PCN) method,
a re-inserted feedback explicit congestion notification (ECN) method, or
a low extra delay background transport (ledbat) method.

* * * * *